United States Patent
Leger et al.

(10) Patent No.: US 12,521,969 B2
(45) Date of Patent: Jan. 13, 2026

(54) MAINTAINING SUITABLE SEALABILITY AND HOT TACK STRENGTHS OF ACRYLIC- AND ACETATE-BASED COATINGS WHEN USING BASE FILMS CONTAINING HCR TO IMPROVE THEIR WATER-VAPOR BARRIERS

(71) Applicant: JFE Innovation Center SRL, Virton (BE)

(72) Inventors: Christian Leger, Heumon (FR); Christophe Guillaume, Namur (BE)

(73) Assignee: JFE Innovation Center SRL, Virton (BE)

(*) Notice: Subject to any disclaimer, the term of this patent is extended or adjusted under 35 U.S.C. 154(b) by 0 days.

(21) Appl. No.: 18/117,305

(22) Filed: Mar. 3, 2023

(65) Prior Publication Data
US 2023/0249443 A1    Aug. 10, 2023

Related U.S. Application Data

(63) Continuation of application No. PCT/US2022/032323, filed on Jun. 6, 2022.

(60) Provisional application No. 63/197,690, filed on Jun. 7, 2021.

(51) Int. Cl.
| | |
|---|---|
| B32B 27/08 | (2006.01) |
| B29C 48/00 | (2019.01) |
| B29C 48/22 | (2019.01) |
| B32B 7/12 | (2006.01) |
| B32B 25/02 | (2006.01) |
| B32B 27/18 | (2006.01) |
| B32B 27/30 | (2006.01) |
| B32B 27/32 | (2006.01) |
| B29K 23/00 | (2006.01) |
| B29K 31/00 | (2006.01) |

(52) U.S. Cl.
CPC ............ *B32B 27/08* (2013.01); *B29C 48/022* (2019.02); *B29C 48/22* (2019.02); *B32B 7/12* (2013.01); *B32B 25/02* (2013.01); *B32B 27/18* (2013.01); *B32B 27/306* (2013.01); *B32B 27/32* (2013.01); *B29K 2023/0616* (2013.01); *B29K 2023/0633* (2013.01); *B29K 2031/04* (2013.01); *B32B 2250/03* (2013.01); *B32B 2250/05* (2013.01); *B32B 2250/242* (2013.01); *B32B 2250/246* (2013.01); *B32B 2250/40* (2013.01); *B32B 2255/10* (2013.01); *B32B 2255/20* (2013.01); *B32B 2255/26* (2013.01); *B32B 2264/1021* (2020.08); *B32B 2307/518* (2013.01); *B32B 2307/704* (2013.01); *B32B 2323/043* (2013.01); *B32B 2323/046* (2013.01); *B32B 2331/04* (2013.01)

(58) Field of Classification Search
None
See application file for complete search history.

(56) References Cited

U.S. PATENT DOCUMENTS

| | | | |
|---|---|---|---|
| 4,807,745 A | 2/1989 | Langley et al. | |
| 11,712,878 B2 * | 8/2023 | Ambroise | B32B 27/302 428/461 |
| 11,718,079 B2 * | 8/2023 | Ambroise | B32B 7/12 428/461 |
| 2002/0103300 A1 | 8/2002 | Klosiewicz | |
| 2006/0141196 A1 | 6/2006 | Utz | |
| 2013/0115398 A1 | 5/2013 | Lu et al. | |
| 2014/0127498 A1 | 5/2014 | Michelman | |
| 2017/0015821 A1 | 1/2017 | Dou et al. | |
| 2018/0361722 A1 | 12/2018 | Ambroise et al. | |
| 2019/0092914 A1 | 3/2019 | Leger et al. | |

OTHER PUBLICATIONS

Karl Rodriguez, International Search Report of the ISA, Aug. 3, 2022, USPTO, Alexandria US.
Karl Rodriguez, Written Opinion of the ISA, Aug. 3, 2022, USPTO, Alexandria US.

* cited by examiner

*Primary Examiner* — Sheeba Ahmed
(74) *Attorney, Agent, or Firm* — Kearney, McWilliams & Davis; Erik J. Osterrieder

(57) ABSTRACT

In one embodiment, the disclosure provides a film, which may be oriented, cast, or blown, that includes a core layer having a first side and a second side, wherein the core layer comprises hydrocarbon resin and polypropylene. Further, the film may include a first tie layer on the first side, wherein the first tie layer consists of polypropylene and about 5% or less of additives with exclusion of hydrocarbon resin ("HCR"), wherein the polypropylene is standard-crystalline polypropylene, high-crystalline polypropylene, or a mixture thereof, but preferably, it is a majority of high-crystalline polypropylene. Further still, the film may include a first skin layer on the first tie layer, and, also a coating on the first skin layer, wherein the coating comprises acrylic or acetate polymers or combinations thereof. The film maintains a minimum seal temperature of 300 g in$^{-1}$ seal strength as compared to the film without any HCR.

20 Claims, No Drawings

MAINTAINING SUITABLE SEALABILITY AND HOT TACK STRENGTHS OF ACRYLIC- AND ACETATE-BASED COATINGS WHEN USING BASE FILMS CONTAINING HCR TO IMPROVE THEIR WATER-VAPOR BARRIERS

REFERENCE TO RELATED APPLICATIONS

This is a continuation application, which claims priority to Patent Treaty Cooperation application number PCT/US22/32323 filed on Jun. 6, 2022 that claims priority to U.S. provisional patent application Ser. Nos. 63/197,690 filed on Jun. 7, 2021 that is hereby incorporated by this reference in its entirety.

FIELD

This application relates to multilayer films, which may have at least one coating having polymers of acetate, acrylic acid, or mixtures thereof applied to a base film having a polypropylene-containing core layer and one or more tie and/or skin layers, wherein the core layer further contains hydrocarbon resin ("HCR"), such that the films have mitigated HCR migration from the core layer to maintain the film's seal and hot tack strengths and have remarkable water vapor transmission rates.

BACKGROUND

Some coated films lose their sealing properties, e.g., seal strengths and hot-tack strengths, when they contain hydrocarbon resin ("HCR"), which is used sometimes to improve water-vapor barrier. This is due to migration of HCR, which pollutes the sealant coating layer. Surprisingly, this disclosure provides films and methods for use of high-crystalline polypropylene ("HCPP") in the tie layer(s) of the base film, i.e., between an HCR-containing core and the skin of the base film, that block or mitigate the migration of this HCR and maintain the sealing properties of the coated film.

SUMMARY

In one embodiment, the disclosure provides a film, which may be oriented, cast, or blown, that includes a core layer having a first side and a second side, wherein the core layer comprises hydrocarbon resin and polypropylene, whether standard-crystalline polypropylene, high-crystalline polypropylene, or a mixture thereof. Further, the film may include a first tie layer on the first side, wherein the first tie layer consists of polypropylene and about 5% or less of additives with exclusion of hydrocarbon resin ("HCR"), wherein the polypropylene is standard-crystalline polypropylene, high-crystalline polypropylene, or a mixture thereof, but preferably, it is a majority of high-crystalline polypropylene, or at least 60 wt. %, 70 wt. %, 80 wt. %, 85 wt. %, 90 wt. %, 95 wt. %, 98 wt. %, or 100 wt. % high-crystalline polypropylene. Further still, the film may include a first skin layer on the first tie layer, and, also a coating on the first skin layer, wherein the coating comprises acrylic or acetate polymers or combinations thereof. The film maintains a minimum seal temperature of 300 g in$^{-1}$ seal strength as compared to the film without any HCR, wherein hydrocarbon resin in a film normally results in loss of seal strength. Furthermore, also has a remarkable water vapor transmission rate of less than about 4 g m$^{-2}$ d$^{-1}$ at 100% relative humidity despite the presence of HCR.

DETAILED DESCRIPTION

Below, directional terms, such as "above," "below," "upper," "lower," "front," "back," "top," "bottom," etc., are used for convenience in referring to the accompanying drawings. In general, "above," "upper," "upward," "top," and similar terms refer to a direction away the earth's surface, and "below," "lower," "downward," "bottom," and similar terms refer to a direction toward the earth's surface, but is meant for illustrative purposes only, and the terms are not meant to limit the disclosure.

Various specific embodiments, versions and examples are described now, including exemplary embodiments and definitions that are adopted herein for purposes of understanding.

While the following detailed description gives specific preferred embodiments, those skilled in the art will appreciate that these embodiments are exemplary only, and that the disclosure can be practiced in other ways. For purposes of determining infringement, the scope of the invention will refer to the any claims, including their equivalents, and elements or limitations that are equivalent to those that are recited.

As used herein, "polymer" may be used to refer to homopolymers, copolymers, interpolymers, terpolymers, etc. Likewise, a "copolymer" may refer to a polymer comprising two monomers or to a polymer comprising three or more monomers.

As used herein, "intermediate" is defined as the position of one layer of a multilayered film, wherein said layer lies between two other identified layers. In some embodiments, the intermediate layer may be in direct contact with either or both of the two identified layers. In other embodiments, additional layers may also be present between the intermediate layer and either or both of the two identified layers.

As used herein, "substantially free" is defined to mean that the referenced film layer is largely, but not wholly, absent a particular component. In some embodiments, small amounts of the component may be present within the referenced layer as a result of standard manufacturing methods, including recycling of film scraps and edge trim during processing.

By "consist essentially of," what is meant, for example, is that a particular film layer does not have any more than 1 wt % or 2 wt % or 3 wt % or 4 wt % or 5 wt % of other polymers in the bulk material constituting the film layer's composition, but "consist essentially of" does not exclude the possibility that the particular film layer also has additives, such as anti-slip agents, anti-blocking agents, anti-oxidants, pigments, whitening agents, cavitation agents, etc. regardless of what polymers or other materials make up the additive(s).

As used herein, "about" means the number itself and/or within 5% of the stated number. For instance, with about 5%, this means 5 and/or any number or range within the range of 4.75 to 5.25, e.g., 4.75 to 4.96, 4.81 to 5.1, etc.

Some coatings, such as those containing acetate and/or acrylic polymers, e.g., acrylic acid, ethylene-methacrylic acid, ethylene-acrylic acid, acrylic acetate, ethylene-vinyl acetate, etc. when deposited on an oriented, cast or blown polypropylene film—abbreviated hereafter as OPP for oriented polypropylene film for ease of discussion—lose their sealing properties, e.g., seal strengths and hot-tack strengths, when the film contains hydrocarbon resin ("HCR"), which may be used to improve the film's water-vapor barrier. This is due to migration of HCR, which pollutes the sealant coating layer. Surprisingly, the inventors have found that a layer of high crystalline polypropylene ("HCPP") can be used in the tie layer(s) of the base film, i.e., between the HCR-containing core and the skin of the base film, to block or at least mitigate the migration of this HCR and maintain the sealing properties of the deposited coating whilst also providing remarkable water-vapor barrier for the coated film.

What are problem(s) to be solved by this disclosure? Solutions achieved include remedying the loss of sealing and hot-tack properties of the previous paragraph's disclosed coatings deposited on an OPP film containing HCR to improve the water-vapor-barrier properties.

What are way(s) that the problem(s) may be solved? There is a need to stop or at least mitigate the migration of the HCR, which is contained in OPP film core by the use of a majority through completely (see "Summary" for example percentages) high-crystalline PP ("HCPP") in the tie layer, which is located between the core and the skin layer of the base film while still providing low water-vapor transmission rates, and this disclosure provides those advantages.

Below are example embodiments, data, and further discussion about the foregoing, wherein each row shows different layers of the example films. The components in at least the tie and core layers exclude the possibility of blending these layers' components to solve the aforementioned problems.

| | | | | Thickness (i.e., at or about) |
|---|---|---|---|---|
| Acrylic | Acrylic | Acrylic | Acrylic | 0.8 g/m² |
| PEI | PEI | PEI | PEI | 0.008 g/m² |
| terpolymer and silica | terpolymer and silica | terpolymer and silica | terpolymer and silica | 0.75 μm |
| HCPP | HCPP | HCPP | HCPP | 2.0 μm |
| HCPP and 10% HCR (optionally in masterbatch (MB), such as PP, or no in MB) | HCPP and 15% HCR (optionally in masterbatch (MB), such as PP, or no in MB) | HCPP and 10% HCR (optionally in masterbatch (MB), such as PP, or no in MB) | HCPP and 15% HCR (optionally in masterbatch (MB), such as PP, or no in MB) | 19.5 μm |
| HCPP | HCPP | HCPP | HCPP | 2.0 μm |
| terpolymer and silica | terpolymer and silica | terpolymer and silica | terpolymer and silica | 0.75 μm |
| PEI | PEI | PEI | PEI | 0.008 g/m² |
| Acrylic | Acrylic | VLTS | VLTS | 0.8 g/m² Acrylic or 0.7 g/m² VLTS |

Legend
HCPP = high-crystalline polypropylene, e.g., Total PPH4070
PEI = polyethyleneimine
Terpolymer = ethylene-propylene-butylene (EPB), e.g., Basell Adsyl 5C99F
HCR = hydrocarbon resin, e.g., Addilene PA639 (i.e., 60 wt. % HCR MB)
Acrylic = 100 phr acrylic + 5.25 phr carnauba wax + 0.3 phr talc
VLTS = 100 phr EAA + 4 phr carnauba wax + 0.3 phr poly(methyl methacrylate) ("PMMA") 4 μm Furthermore, below is a table showing physical properties of example embodiments of the disclosed film:

| | | | | | | |
|---|---|---|---|---|---|---|
| CGT Wt | IN | g/m² | 0.92/0.93 | 0.92/0.93 | 0.80/1.01 | 0.80/1.01 |
| CTG Wt | OUT | g/m² | 0.80/0.84 | 0.80/0.84 | 0.76/0.80 | 0.76/0.80 |
| WVTr | 100% RH | g/m²day | 3.50 | 3.58 | 3.68 | 3.67 |
| Haze | | % | 1.3/1.3/1.4 | 1.2/1.2/1.3 | 1.6/1.4/1.4 | 1.6/1.5/1.5 |
| Gloss 45° | IN | GU | 85/85/85 | 85/84/85 | 84/86/86 | 86/86/85 |
| Yield | | m²/kg | 41.67 | 40.51 | 42.22 | 40.61 |
| COF | IN/IN | | 0.28/0.28 | 0.28/0.27 | 0.31/0.30 | 0.31/0.31 |
| COF | OUT/OUT | | 0.28/0.28 | 0.29 | 0.29 | 0.36/0.34 |
| Stab Dim | MD | % | −4.67/−4.00/−4.00 | −4.33/−4.33/−4.33 | −5.67/−4.33/−5.00 | −3.67/−3.33/−3.67 |
| Stab Dim | TD | % | −0.67/−0.67/−0.67 | −0.67/−0.67/−0.67 | −1.33/−1.33/−1.33 | −1.00/−0.67/−0.33 |
| RDM MST T300 | IN/IN | °C. | 91/92/88 | 90/91/90 | 88/98 | 86/88 |
| RDM MST T300 | OUT/OUT | °C. | 89/87/86 | 87/88/89 | 65/65 | 65/62 |
| Tensile | MD | N/mm² | 120 | 120 | 123 | 118 |
| Tensile | TD | N/mm² | 228 | 212 | 225 | 223 |
| Elong. | MD | % | 203 | 201 | 195 | 199 |
| Elong. | TD | % | 65 | 59 | 70 | 72 |
| Modulus | MD | N/mm² | 2092 | 2144 | 1927 | 2048 |

If the core layer (i.e., the thickest layer) comprises, consists essentially of or consists of PP instead of HCPP as shown in the first table, then the film still works to minimize or stop the migration of HCR, but the film's mechanical properties will be affected, e.g., lower modulus and dimensional stabilities. In preferable embodiments, the core layer contains more HCPP than standard-crystalline polypropylene, e.g., at least 51 wt % or more, 60 wt. %, 70 wt. %, 80 wt. %, 85 wt. %, or 90 wt. % high-crystalline polypropylene with the remaining balance being HCR.

If PP is used in tie layer (i.e., the layers immediately flanking the core layer shown in the first figure), or even worse PP+HCR (here, for example, HCR may be introduced via PA639 MB), then the sealing and hot tack properties of, for example, acrylic coating will be negatively affected and the sealing of a coating containing EAA will be fully lost. In particular disclosed examples, though non-limiting, the minimum sealing temperature ("MST") of 300 g/inch seal strength, such as under ASTM F88, is maintained for Ac (86 to 92° C.) and for EAA (62 to 65° C.) coatings for the disclosed films in the tables or in modifications as discussed herein. Regardless of which particular methodologies are selected to measure temperatures and/or seal strengths, if the same methodologies are chosen, then the minimum seal temperature of 300 g in$^{-1}$ seal strength of the disclosed film is maintained as compared to the same film without any hydrocarbon resin present, but the water-vapor transmission rate of the disclosed film is less, i.e., an improvement, as compared to the same film.

About 2 μm of an HCPP-containing tie layer is enough to maintain the coated film's sealing properties, but this thickness might be as low as 0.5 μm, 0.75 μm, 1.0 μm, or 1.5 μm in each or both of the tie layers, wherein each of these tie layers may have the same or different thickness. Greater thickness of the HCPP tie layer leads to the same result, i.e., cessation or at least minimization of HCR migration.

If the HCPP in tie layers is replaced by PP, or by PP+HCR, and the rest of the first figure is maintained (i.e., thicknesses and coating weights), then the following four structures are considered:

The films shown in the immediately preceding table's first two columns are downgraded and hot tack is completely lost as compared to and dissimilar from the first table's films.

The films shown in the immediately preceding table's last two columns have completely lost sealing and hot tack as compared to and dissimilar from the first table's films.

If the core layer of the films shown in the immediately preceding table has HCPP replaced by PP, then sealing and hot tack are lost as compared to and dissimilar from the first table's films.

In some embodiments, the first tie layer consists of polypropylene and about 5% or less of additives with exclusion of hydrocarbon resin ("HCR"), wherein the polypropylene is standard-crystalline polypropylene, high-crystalline polypropylene, or a mixture thereof, but preferably, it is a majority of high-crystalline polypropylene, or at least 60 wt. %, 70 wt. %, 80 wt. %, 85 wt. %, 90 wt. %, 95 wt. %, 98 wt. %, or 100 wt. % high-crystalline polypropylene.

The water barriers, i.e., about from 3.5 through 3.7 g/m$^2$/day at 100% RH, such as under ASTM P1249, are reached for the four films shown in the immediately preceding table because of the HCR. However, if all else is constant in these films shown in the immediately preceding table except that HCR is removed from these films, then the water-vapor transmission rate increase to about 8 g/m$^2$/day at 100% RH, such as under ASTM F1249.

The polypropylene of the core and tie layers of the film may be made by any desirable process using any desirable catalyst as is known in the art, such as a Ziegler-Natta catalyst, a metallocene catalyst, other single-site catalyst(s), using solution, slurry, high pressure, or gas phase processes, or combinations thereof. In any case, useful polypropylenes have a melting point (ASTM D3418) of at least 125° C. or 130° C. or 140° C. or 150° C. or 160° C., or within a range of from 125° C. or 130° C. to 140° C. or 150° C. or 160° C. .

The term "crystalline," as used herein, such as in "standard-crystalline," characterizes those polypropylene polymers as possessing high degrees of inter- and intra-molecular order. Preferably, the polypropylene has a heat of fusion

|  |  |  |  | Thickness (i.e., at or about) |
|---|---|---|---|---|
| Acrylic | Acrylic | Acrylic | Acrylic | 0.8 g/m$^2$ |
| PEI | PEI | PEI | PEI | 0.008 g/m$^2$ |
| terpolymer and silica | terpolymer and silica | terpolymer and silica | terpolymer and silica | 0.75 μm |
| PP+ | PP 10% HCR (optionally in masterbatch (MB), such as PP, or no in MB) | PP | PP + 10% HCR (optionally in masterbatch (MB), such as PP, or no in MB) | 2.0 μm |
| HCPP and 10% HCR (optionally in masterbatch (MB), such as PP, or no in MB) | HCPP and 10% HCR (optionally in masterbatch (MB), such as PP, or no in MB) | HCPP and 10% HCR (optionally in masterbatch (MB), such as PP, or no in MB) | HCPP and 10% HCR (optionally in masterbatch (MB), such as PP, or no in MB) | 19.5 μm |
| PP+ | PP 10% HCR (optionally in masterbatch (MB), such as PP, or no in MB) | PP | PP + 10% HCR (optionally in masterbatch (MB), such as PP, or no in MB) | 2.0 μm |
| terpolymer and silica | terpolymer and silica | terpolymer and silica | terpolymer and silica | 0.75 μm |
| PEI | PEI | PEI | PEI | 0.008 g/m$^2$ |
| Acrylic | Acrylic | VLTS | VLTS | 0.8 g/m$^2$ Acrylic or 0.7 g/m$^2$ VLTS |

($H_f$) greater than 60 J/g or 70 J/g or 80 J/g, as determined by DSC analysis. The heat of fusion is dependent on the composition of the polypropylene. The thermal energy for the highest order of polypropylene is estimated at 189 J/g that is, 100% crystallinity is equal to a heat of fusion of 189 J/g. A polypropylene homopolymer will have a higher heat of fusion than a copolymer or blend of homopolymer and copolymer. Also, the polypropylenes useful herein may have a glass transition temperature (ISO 11357-1, $T_g$) preferably between -20° C. or -10° C. or 0° C. to 10° C. or 20° C. or 40° C. or 50° C. Preferably, the polypropylenes have a Vicat softening temperature (ISO 306, or ASTM D 1525) of greater than 120° C. or 110° C. or 105° C. or 100° C., or within a range of from 100° C. or 105° C. to 110° C. or 120° C. or 140° C. or 150° C. or a particular range of from 110° C. or 120° C. to 150° C.

Preferably, the polypropylene has a melt flow rate ("MFR", 230° C., 2.16 kg, ASTM D1238) within the range of from 0.1 g/10 min or 0.5 g/10 min or 1 g/10 min to 4 g/10 min or 6 g/10 min or 8 g/10 min or 10 g/10 min or 12 g/10 min or 16 g/10 min or 20 g/10 min. Also, the polypropylene may have a molecular weight distribution (determined by GPC) of from 1.5 or 2.0 or 2.5 to 3.0 or 3.5 or 4.0 or 5.0 or 6.0 or 8.0, in certain embodiments. Suitable grades of polypropylene that are useful in the oriented films described herein include those made by ExxonMobil, LyondellBasell, Total, Borealis, Japan Polypropylene, Mitsui and other sources.

A "highly crystalline" polypropylene, such as may be found singly or in combination with the above-discussed "standard-crystalline polypropylene" in the core and tie layer(s) in certain embodiments, although HCPP is preferred, is typically isotactic and comprises 100 wt % propylene-derived units (propylene homopolymer) and has a relatively high melting point of from 140° C. or 145° C. or 150° C. or 155° C. or 160° C. or 165° C. to higher. Skin Layer(s), Including Metallizable Skin Layers and Printable Layers In some embodiments, the skin layer comprises at least one polymer selected from the group comprising, consisting essentially of, and/or consisting of polypropylene copolymers or terpolymers (e.g., EPB shown in the tables, but others may be used), which may be grafted or copolymerized, and a metallocene based material of either polypropylene or ethylene propylene copolymer.

The skin layer may also comprise processing aid additives, such as anti-block agents, anti-static agents, slip agents and combinations thereof, as discussed in further detail below.

The thickness of the skin layer depends upon the intended function of the skin layer, but is typically in the range of from about 0.20 μm through 3.5 μm, or from 0.30 μm through 2 μm, or in many embodiments, from 0.50 μm through 1.0 μm. In thin film embodiments, the skin layer thickness may range from about 0.20 μm through 1.5 μm, or 0.50 μm through 1.0 μm.

Additives

Additives present in the film's layer(s) may include, but are not limited to opacifying agents, pigments, colorants, cavitating agents, slip agents, antioxidants, anti-fog agents, anti-static agents, anti-block agents, fillers, moisture barrier additives, gas barrier additives, gas scavengers, and combinations thereof. Such additives may be used in effective amounts, which vary depending upon the property required.

Examples of suitable opacifying agents, pigments or colorants are iron oxide, carbon black, aluminum, titanium dioxide (TiO2), calcium carbonate (CaCO3), and combinations thereof.

Cavitating or void-initiating additives may include any suitable organic or inorganic material that is incompatible with the polymer material(s) of the layer(s) to which it is added, at the temperature of biaxial orientation, in order to create an opaque film. Examples of suitable void-initiating particles are PBT, nylon, solid or hollow pre-formed glass spheres, metal beads or spheres, ceramic spheres, calcium carbonate, talc, chalk, or combinations thereof. The average diameter of the void-initiating particles typically may be from about 0.1 to 10 μm.

Slip agents may include higher aliphatic acid amides, higher aliphatic acid esters, waxes, silicone oils, and metal soaps. Such slip agents may be used in amounts ranging from 0.1 wt % to 2 wt % based on the total weight of the layer to which it is added. An example of a slip additive that may be useful is erucamide.

Non-migratory slip agents, used in one or more skin layers of the multilayered films, may include polymethyl methacrylate (PMMA). The non-migratory slip agent may have a mean particle size in the range of from about 0.5 μm to 8 μm, or 1 μm to 5 μm, or 2 μm to 4 μm, depending upon layer thickness and desired slip properties. Alternatively, the size of the particles in the non-migratory slip agent, such as PMMA, may be greater than 20% of the thickness of the skin layer containing the slip agent, or greater than 40% of the thickness of the skin layer, or greater than 50% of the thickness of the skin layer. The size of the particles of such non-migratory slip agent may also be at least 10% greater than the thickness of the skin layer, or at least 20% greater than the thickness of the skin layer, or at least 40% greater than the thickness of the skin layer. Generally spherical, particulate non-migratory slip agents are contemplated, including PMMA resins, such as EPOSTAR™ (commercially available from Nippon Shokubai Co., Ltd. of Japan). Other commercial sources of suitable materials are also known to exist. Non-migratory means that these particulates do not generally change location throughout the layers of the film in the manner of the migratory slip agents. A conventional polydialkyl siloxane, such as silicone oil or gum additive having a viscosity of 10,000 to 2,000,000 centistockes is also contemplated.

Suitable anti-oxidants may include phenolic anti-oxidants, such as IRGANOX® 1010 (commercially available from Ciba-Geigy Company of Switzerland). Such an anti-oxidant is generally used in amounts ranging from 0.1 wt % to 2 wt %, based on the total weight of the layer(s) to which it is added.

Anti-static agents may include alkali metal sulfonates, polyether-modified polydiorganosiloxanes, polyalkylphenylsiloxanes, and tertiary amines. Such anti-static agents may be used in amounts ranging from about 0.05 wt % to 3 wt %, based upon the total weight of the layer(s).

Examples of suitable anti-blocking agents may include silica-based products such as SYLOBLOC® 44 (commercially available from Grace Davison Products of Colombia, Md.), PMMA particles such as EPOSTAR™ (commercially available from Nippon Shokubai Co., Ltd. of Japan), or polysiloxanes such as TOSPEARL™ (commercially available from GE Bayer Silicones of Wilton, Conn.). Such an anti-blocking agent comprises an effective amount up to about 3000 ppm of the weight of the layer(s) to which it is added.

Useful fillers may include finely divided inorganic solid materials such as silica, fumed silica, diatomaceous earth, calcium carbonate, calcium silicate, aluminum silicate, kaolin, talc, bentonite, clay and pulp.

Optionally, nonionic or anionic wax emulsions can be included in the coating(s), i.e., skin layer(s), to improve blocking resistance and/or lower the coefficient of friction. For example, an emulsion of Michem Lube 215, Michem Lube 160 may be included in the skin layer(s). Any conventional wax, such as, but not limited to Carnauba™ wax (commercially available from Michelman Corporation of Cincinnati, Ohio) that is useful in thermoplastic films is contemplated.

Metallization

The outer surface (i.e., side facing away from the core) of a skin layer and/or laminating substrate may undergo metallization after optionally being treated. Metallization may be carried out through conventional methods, such as vacuum metallization by deposition of a metal layer such as aluminum, copper, silver, chromium, or mixtures thereof. Following metallization, a coating may be applied to the outer metallized layer "outside" or "inside" the vacuum chamber to result in the following structure: metallized layer/skin layer/optional tie layer/core/optional tie layer/skin layer/metallized layer. In an additional embodiment, a primer may be applied on the metal surface(s) followed by top coating(s).

In certain embodiments, the metal for metallization is metal oxide, any other inorganic materials, or organically modified inorganic materials, which are capable of being vacuum deposited, electroplated or sputtered, such as, for example, SiOx, AlOx, SnOx, ZnOx, IrOx, wherein x=1 or 2, organically modified ceramics "ormocer", etc. The thickness of the deposited layer(s) is typically in the range from 100 to 5,000 Angstrom or preferably from 300 to 3000 Angstrom.

Surface Treatment

One or both of the outer surfaces of the multilayered films may be surface-treated to increase the surface energy to render the film receptive to metallization, coatings, printing inks, adhesives, and/or lamination. The surface treatment can be carried out according to one of the methods known in the art including corona discharge, flame, plasma, chemical treatment, or treatment by means of a polarized flame.

Priming

An intermediate primer coating may be applied to multilayered films. In this case, the film may be first treated by one of the foregoing methods to provide increased active adhesive sites thereon and to the thus-treated film surface there may be subsequently applied a continuous coating of a primer material. Such primer materials include, for example, epoxy, polyethyleneimine (PEI), and polyurethane materials. U.S. Pat. Nos. 3,753,769, 4,058,645 and 4,439,493, each incorporated herein by reference, discloses the use and application of such primers. The primer provides an overall adhesively active surface for thorough and secure bonding with the subsequently applied coating composition and can be applied to the film by conventional solution coating means, for example, by roller application.

Orienting

The films herein are also characterized in certain embodiments as being biaxially oriented. The films can be made by any suitable technique known in the art, such as a tentered or blown process, LISIM™, and others. Further, the working conditions, temperature settings, lines speeds, etc. will vary depending on the type and the size of the equipment used. Nonetheless, described generally here is one method of making the films described throughout this specification. In a particular embodiment, the films are formed and biaxially oriented using the tentered method. In the tentered process, line speeds of greater than 100 m/min to 400 m/min or more, and outputs of greater than 2000 kg/h to 4000 kg/h or more are achievable. In the tenter process, sheets/films of the various materials are melt-blended and coextruded, such as through a 3, 4, 5, 7-layer die head, into the desired film structure. Extruders ranging in diameters from 100 mm to 300 or 400 mm, and length to diameter ratios ranging from 10/1 to 50/1 can be used to melt blend the molten layer materials, the melt streams then metered to the die having a die gap(s) within the range of from 0.5 or 1 to an upper limit of 3 or 4 or 5 or 6 mm. The extruded film is then cooled using air, water, or both. Typically, a single, large diameter roll partially submerged in a water bath, or two large chill rolls set at 20 or 30 to 40 or 50 or 60 or 70° C. are suitable cooling means. As the film is extruded, an air knife and edge pinning are used to provide intimate contact between the melt and chill roll.

Downstream of the first cooling step in this embodiment of the tentered process, the unoriented film is reheated to a temperature of from 80 to 100 or 120 or 150° C., in one embodiment by any suitable means such as heated S-wrap rolls, and then passed between closely spaced differential speed rolls to achieve machine direction orientation. It is understood by those skilled in the art that this temperature range can vary depending upon the equipment, and in particular, upon the identity and composition of the components making up the film. Ideally, the temperature will be below that which will melt the film, but high enough to facilitate the machine direction orientation process. Such temperatures referred to herein refer to the film temperature itself. The film temperature can be measured by using, for example, infrared spectroscopy, the source aimed at the film as it is being processed; those skilled in the art will understand that for transparent films, measuring the actual film temperature will not be as precise. The heating means for the film line may be set at any appropriate level of heating, depending upon the instrument, to achieve the stated film temperatures.

The lengthened and thinned film is passed to the tenter section of the line for TD orientation. At this point, the edges of the sheet are grasped by mechanical clips on continuous chains and pulled into a long, precisely controlled hot air oven for a pre-heating step. The film temperatures range from 100 or 110 to 150 or 170 or 180° C. in the pre-heating step. Again, the temperature will be below that which will melt the film, but high enough to facilitate the step of transverse direction orientation. Next, the edges of the sheet are grasped by mechanical clips on continuous chains and pulled into a long, precisely controlled hot air oven for transverse stretching. As the tenter chains diverge a desired amount to stretch the film in the transverse direction, the process temperature is lowered by at least 2° C. but typically no more than 20° C. relative to the pre-heat temperature to maintain the film temperature so that it will not melt the film. After stretching to achieve transverse orientation in the film, the film is annealed at a temperature below the melting point, and the film is then cooled from 5 to 10 or 15 or 20 or 30 or 40° C. below the stretching temperature, and the clips are released prior to edge trim, optional coronal, printing and/or other treatment can then take place, followed by winding.

Thus, TD orientation is achieved by the steps of pre-heating the film having been machine oriented, followed by stretching and annealing it at a temperature below the melt point of the film, and then followed by a cooling step at yet a lower temperature. In one embodiment, the films described herein are formed by imparting a transverse orientation by a process of first pre-heating the film, followed by a decrease in the temperature of the process within the range of from 2 or 3 to 5 to 10 or 15 or 20° C. relative to the pre-heating temperature while performing transverse orientation of the film, followed by a lowering of the temperature within the range of from 5° C. to 10 or 15 or 20 or 30 or 40° C. relative to the melt point temperature, holding or slightly decreasing (more than 5%) the amount of stretch, to allow the film to anneal. The latter step imparts the low TD shrink characteristics of the films described herein. Thus, for example, where the pre-heat temperature is 120° C., the stretch temperature may be 114° C., and the cooling step may be 98° C., or any temperature within the ranges disclosed. The steps are carried out for a sufficient time to affect the desired film properties as those skilled in the art will understand.

Thus, in certain embodiments the film(s) described herein are biaxially oriented with at least a 5 or 6 or 7 or 11-fold TD orientation and at least a 2 or 3 or 7-fold MD orientation. Being so formed, the at least three-layer (one core, two skin layers, 18-21 μm thickness) possess an ultimate tensile strength within the range of from 100 or 110 to 80 or 90 or 250 MPa in the TD in certain embodiments; and possess an ultimate tensile strength within the range of from 30 or 40 to 150 or 130 MPa in the MD in other embodiments.

In other embodiments, the disclosed film is not oriented, but, instead, is achieved though cast, blown, or double-bubble processes, wherein such processes as are known in the art to the skilled artisan.

Industrial Applicability

The disclosed multilayered films may be stand-alone films, laminates, or webs. Or, the multilayered films may be sealed, coated, metallized, and/or laminated to other film structures. The laminating substrate, itself, may for instance, be a BOPP or a non-oriented, cast or blown PP film or other polymer film with or without the assistance of adhesive(s), increases in temperature and/or pressure, water or solvents, etc.; furthermore, the laminating substrate may or may not be metallized and/or coated. The disclosed multilayered films may be prepared by any suitable methods comprising the steps of co-extruding a multilayered film according to the description and claims of this specification, orienting and preparing the film for intended use such as by coating, printing, slitting, or other converting methods.

For some applications, it may be desirable to laminate the multilayered films to other polymeric film or paper products for purposes such as package decor including printing and metallizing. These activities are typically performed by the ultimate end-users or film converters who process films for supply to the ultimate end-users.

The prepared multilayered film may be used as a flexible packaging film to package an article or good, such as a food item or other product. In some applications, the film may be formed into a pouch type of package, such as may be useful for packaging a beverage, liquid, granular, or dry-powder product.

Below are further example embodiments of the disclosed film that are written in claim form:

1. A film comprising:
    a core layer having a first side and a second side, wherein the core layer comprises polypropylene and hydrocarbon resin;
    a first tie layer on the first side, wherein the first tie layer consists of polypropylene and about 5% or less of additives with exclusion of hydrocarbon resin;
    a first skin layer on the first tie layer; and
    a coating on the first skin layer, wherein the coating comprises acrylic or acetate polymers,
    wherein minimum seal temperature of 300 g in$^{-1}$ seal strength of the film is maintained as compared to the film without any hydrocarbon resin.
2. The film of claim 1, wherein the film has a water vapor transmission rate of less than about 4 g m$^2$ d$^{-1}$ at 100% relative humidity.
3. The film of claim 1, wherein the polypropylene in the core comprises high-crystalline polypropylene.
4. The film of claim 1, wherein the polypropylene in the core comprises standard-crystalline polypropylene and high-crystalline polypropylene.
5. The film of claim 1, further comprising a primer between the first skin layer and the coating.
6. The film of claim 5, wherein the primer comprises polyethylenimine.
7. The film of claim 5, wherein the primer comprises polyurethane.
8. The film of claim 5, wherein the primer comprises epoxy-based compounds.
9. The film of claim 5, wherein the primer comprises acrylic-based compounds.
10. The film of claim 1, wherein the first skin layer comprises ethylene-propylene-butylene terpolymer.
11. The film of claim 1, wherein the first skin layer comprises ethylene-propylene copolymer.
12. The film of claim 1, further comprising one or more additives.
13. The film of claim 1, further comprising a second tie layer on the second side of the core layer.
14. The film of claim 13, wherein the second tie layer comprises high-crystalline polypropylene.
15. The film of claim 13, further comprising a second skin layer on the second tie layer, wherein the second tie layer comprises polypropylene.
16. The film of claim 15, further comprising a second primer on the second skin layer, wherein the second primer is identical to or different from the primer.
17. The film of claim 15, further comprising a second primer on the second skin layer, wherein the second primer is different from the primer.
18. The film of claim 16, further comprising a second coating between the second skin layer and the second primer, wherein the second coating is identical to the coating.
19. The film of claim 16, further comprising a second coating between the second skin layer and the second primer, wherein the second coating is different from the coating.
20. The film of claim 17, further comprising a second coating between the second skin layer and the second primer, wherein the second coating is identical to the coating.

What is claimed is:

1. A film comprising:
  a core layer having a first side and a second side, wherein the core layer consists essentially of polypropylene and hydrocarbon resin, wherein the hydrocarbon resin is optionally in masterbatch solution;
  a first tie layer on the first side, wherein the first tie layer consists of polypropylene and about 5% or less of additives with exclusion of hydrocarbon resin;
  a first skin layer on the first tie layer; and
  a coating on the first skin layer, wherein the coating comprises acrylic or acetate polymers, wherein minimum seal temperature of 300 g in$^{-1}$ seal strength of the film is maintained as compared to the film without any hydrocarbon resin.

2. The film of claim 1, wherein the film has a water vapor transmission rate of less than about 4 g m$^{-2}$ d$^{-1}$ at 100% relative humidity.

3. The film of claim 1, wherein the polypropylene in the core comprises high-crystalline polypropylene.

4. The film of claim 1, wherein the polypropylene in the core comprises standard-crystalline polypropylene and high-crystalline polypropylene.

5. The film of claim 1, further comprising a primer between the first skin layer and the coating.

6. The film of claim 1, wherein the first skin layer comprises ethylene-propylene copolymer.

7. The film of claim 1, further comprising a second tie layer on the second side of the core layer.

8. The film of claim 7, wherein the second tie layer comprises high-crystalline polypropylene.

9. The film of claim 7, further comprising a second skin layer on the second tie layer, wherein the second tie layer comprises polypropylene.

10. The film of claim 9, further comprising a second primer on the second skin layer, wherein the second primer is identical to or different from the primer.

11. The film of claim 9, further comprising a second primer on the second skin layer, wherein the second primer is different from the primer.

12. The film of claim 10, further comprising a second coating between the second skin layer and the second primer, wherein the second coating is identical to the coating.

13. The film of claim 10, further comprising a second coating between the second skin layer and the second primer, wherein the second coating is different from the coating.

14. The film of claim 1, wherein the hydrocarbon resin is in a polypropylene-based masterbatch solution.

15. The film of claim 1, wherein the coating comprises wax.

16. The film of claim 1, wherein the coating comprises talc.

17. The film of claim 1, wherein the film is oriented.

18. The film of claim 1, wherein the film is a cast film or a blown film.

19. The film of claim 1, wherein the film further comprises adhesive on the second side of the core layer.

20. The film of claim 19, wherein the film further comprises a release layer on the adhesive to form a label.

21. The film of claim 17, further comprising a second coating between the second skin layer and the second primer, wherein the second coating is different from the coating.

22. The film of claim 1, wherein the first skin layer consists of: (i) ethylene-propylene copolymer and/or ethylene-propylene-butylene terpolymer; and (ii) anti-block agent.

23. The film of claim 1, wherein the hydrocarbon resin is in a masterbatch solution.

24. The film of claim 23, wherein the masterbatch solution is a polypropylene-based masterbatch solution.

25. The film of claim 1, wherein the acrylic or acetate polymers comprise polymers based on acrylic acid.

26. The film of claim 1, wherein the acrylic or acetate polymers comprise polymers based on ethylene-methacrylic acid.

27. The film of claim 1, wherein the acrylic or acetate polymers comprise polymers based on ethylene-acrylic acid.

28. The film of claim 1, wherein the acrylic or acetate polymers comprise polymers based on acrylic acetate.

29. The film of claim 1, wherein the acrylic or acetate polymers comprise polymers based on ethylene-vinyl acetate.

30. The film of claim 1, wherein the coating comprises wax.

31. The film of claim 1, wherein the coating comprises talc.

32. The film of claim 1, wherein the coating comprises wax and talc.

33. The film of claim 1, wherein the film is oriented.

34. The film of claim 1, wherein the film is a cast film or a blown film.

35. The film of claim 1, wherein the film further comprises adhesive on the second side of the core layer.

36. The film of claim 35, wherein the film further comprises a release layer on the adhesive to form a label.

37. The film of claim 1, wherein the film further comprises a metallizing layer.

38. The film of claim 1, wherein the film further comprises a substrate laminated to the film.

* * * * *